Figure 1:
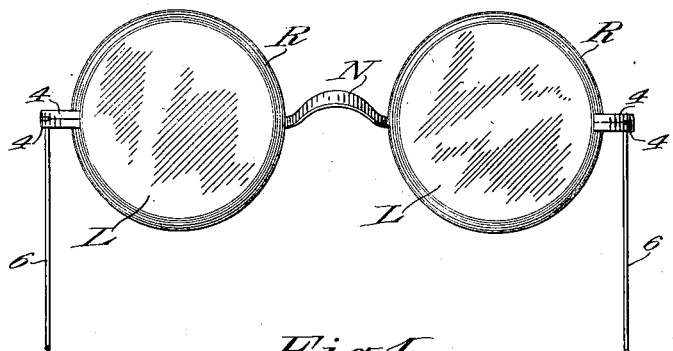

L. C. MARTIN.
OPHTHALMIC MOUNTING.
APPLICATION FILED MAY 29, 1920.

1,431,971.

Patented Oct. 17, 1922.

Inventor:
Lawrence C. Martin
By
Arthur F. Armington
Attorney.

Patented Oct. 17, 1922.

1,431,971

UNITED STATES PATENT OFFICE.

LAURENCE C. MARTIN, OF PROVIDENCE, RHODE ISLAND, ASSIGNOR TO EDGAR W. MARTIN, OF BARRINGTON, RHODE ISLAND, LAURENCE C. MARTIN, OF PROVIDENCE, RHODE ISLAND, AND GEORGE W. BLEECKER, OF CHICAGO, ILLINOIS, TRUSTEES OF MARTIN-COPELAND COMPANY.

OPHTHALMIC MOUNTING.

Application filed May 29, 1920. Serial No. 385,299.

*To all whom it may concern:*

Be it known that I, LAURENCE C. MARTIN, a citizen of the United States, residing at Providence, in the county of Providence, State of Rhode Island, have invented certain new and useful Improvements in Ophthalmic Mountings, of which the following is a specification.

This invention relates to improvements in ophthalmic mountings for eyeglass and spectacle lenses and in the method of manufacturing the same.

The main object of the invention is to provide an improved mounting consisting of a spectacle or eyeglass frame having inner metallic lens-holding rims with outer non-metallic enclosing portions.

A particular object of the invention is to provide improved means for connecting the metallic and non-metallic portions of the frame to secure a firm, unitary structure having greater strength and durability.

Another object of the invention is to provide an improved method of manufacturing the mounting to save labor and reduce the cost of the article.

Figures 2, 3:
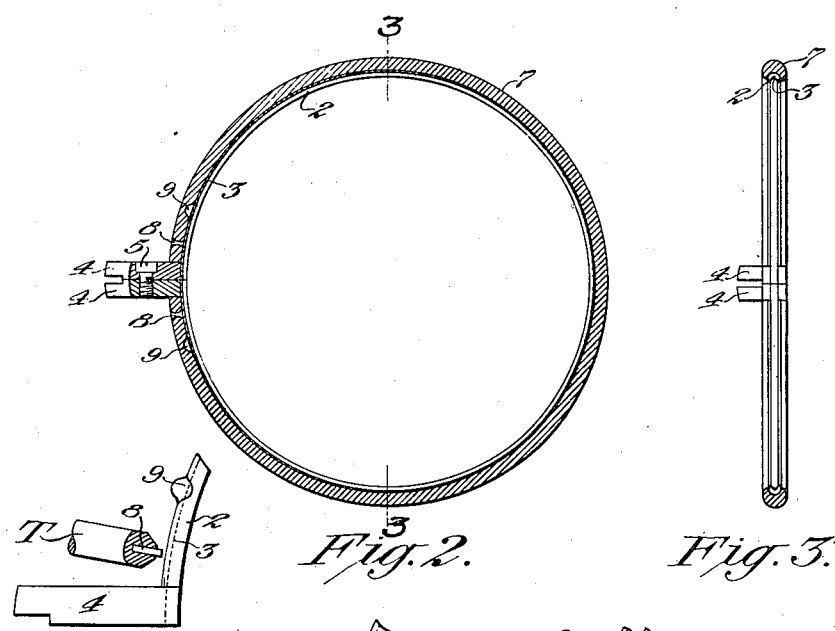

Further objects of the invention will appear from the description of one embodiment of the invention as set forth in the following specification, which is illustrated by the accompanying drawings. In the drawings:

Fig. 1 is a general view of a spectacle-frame embodying the improvements;

Fig. 2, an enlarged vertical sectional view of one of the rims of the frame showing the inner metallic lens-holding member of the rim and the outer non-metallic enclosing portion.

Figures 4, 5:
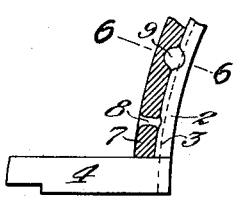

Fig. 3, an enlarged cross-sectional view of the rim taken on the line 3—3 of Fig. 2;

Fig. 4, a still further enlarged view of the end section of the metallic rim-member showing the anchoring or fastening means for the outer non-metallic portion of the rim.

Figure 7:
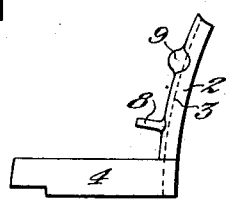
Figure 6:

Fig. 5, a similar view showing the non-metallic portion of the rim in section and illustrating the manner of securing it in place on the inner rim-member;

Fig. 6, a cross-sectional view of the composite rim taken on the line 6—6 of Fig. 5; and Fig. 7, a view showing a step in the process of manufacturing my improved mounting.

Referring to the drawings, Fig. 1 illustrates a well known type of spectacle frame having circular lens-holding rims R connected by a bridge or nosepiece N. The rims R are constructed with inner, relatively light, metallic rings 2 which are grooved at 3, see Fig. 3, to adapt them to receive the edges of the lenses L, with their abutting ends clamped together by joint-plates or end-pieces 4. The end-members 4 are fastened together by screws 5, see Fig. 2, and serve as means for pivotally connecting the temples 6 to the frame. Surrounding the inner ring 2 is an outer rim-member 7 which is usually of substantially cylindrical shape in cross-section, see Fig. 3, and constructed of celluloid, zylonite or similar non-metallic material. The outer rim-member 7 has a more or less translucent appearance and is generally colored to simulate tortoise-shell, whereby to enhance the artistic effect of the mounting. The outer non-metallic rim-member 7 also serves as a cushioning element or resilient buffer surrounding the inner rim-member 2 to protect the lens from being broken when the spectacles or eyeglasses are dropped on the floor or otherwise subjected to harsh treatment.

The celluloid or similar material from which the outer rim-member 7 is constructed has considerable elasticity, but is somewhat fragile and hence it is a difficult matter to fasten it to the inner metallic rim-member 2 with a firm and secure union. Various fastening-means such as pins, screws, clamps and the like have heretofore been used to tie the outer non-metallic rim-member 7 to the inner metallic member 2, but most of these have been found unsatisfactory as the celluloid or other material is liable to chip, split, or tear away from the metal under hard service. The most common method of fastening the outer rim-member to the inner member is by the use of pins or rivets 8, see Fig. 2, which project through the celluloid rim 7 at points adjacent the ends abutting the end-pieces 4. With such a fastening-means, however, the outer rim-member 7 is liable to split away from the pins, due to the strain induced by contraction and expansion of the material under the effect of changes in temperature. It is desirable to construct the outer rim-member 7 of small proportions in order to give a neater and lighter appearance to the whole frame or mounting, and in the effort to accomplish this object the strength and durability of the mounting is often sacrificed.

It is one of the particular objects of the present invention to provide a method of fastening the outer rim-member 7 to the inner member 2 to give the greatest degree of security and permanence to the mounting, while permitting the use of a relatively small and light inclosing rim. To provide this improvement I have devised a method of fastening the ends of the outer rim-member 7 to the inner member 2 with an element which is anchored in the celluloid or other material without piercing through the outer rim-member so that there is less tendency to split the rim. In carrying out this improved method I make use of the end pins or rivets 8 to tie the outer rim-member 7 down to the inner member 2, and in addition to this tying-means I employ a lug or abutment 9 which is embedded in the inner side of the member 7. The abutment or lug 9 is preferably formed integral with the inner metallic rim-member 2, and may be conveniently constructed on the periphery thereof by swaging or punching the metal inwardly from the sides of the rim, see Figs. 4 and 6. As illustrated in these views, the abutment 9 is constructed in the form of a fin-like hump or projection located at a slight distance rearwardly from the pin or rivet 8 on the outer periphery of the member 2. The abutment 9 is relatively thin in cross-section, see Fig. 6, and when the outer rim-member 7 is pressed firmly into place against the inner member 2 the abutment will be forced into the celluloid or other material without splitting it. In this way the abutment or holding-lug 9 is embedded in the material of the rim-member 7 and caused to take a grip thereon to prevent the outer member from creeping around the inner member 2. The pins or rivets 8 are employed solely to tie the ends of the rim 7 down to the rim 2, being inserted through holes therein and headed over at their ends; while the lugs 9 take the longitudinal thrust of the rim 7 when the material expands and contracts and thus prevent it from splitting or tearing away from the pins.

In accordance with the usual practice heretofore employed in this art the pins or rivets 8 are constructed from fine wire and secured on the inner rim-members 2 by soldering their ends thereto. It requires very careful and painstaking work to solder these small pins to the rim-members 2 and an important feature of the present invention consists in the improved method of attaching the pins to the rims as next explained. I have found that instead of constructing the pins 8 of steel or brass wire I may make use of a solder wire for this purpose and by this means I greatly simplify the operation of fastening the pins to the rim-members 2. In carrying out this part of the invention I employ a fine wire of solder, usually silver or gold solder, and insert it in the end of a socketed pencil-like holder or tool T, see Fig. 7. To fasten the pin 8 to the rim it is only necessary to heat the metallic rim-member 2 slightly and then apply the end of the solder-pin thereto. The heat fuses the end of the pin 8 as it is brought against the rim-member 2, while being held in the tool T, and the pin is thus united to the rim without the use of a burner or soldering iron, and without the necessity of flowing solder to the joint. In this way I am enabled to make a neater and smoother joint with less skill and labor and without the use of the usual tools and appurtenances generally employed for this purpose. The operation of fastening the pin to the metallic rim-member can thus be performed with greater expedition and less effort and consequently the cost of manufacture of the mounting is considerably reduced.

I believe I am the first to make use of a solder pin or rivet which may be more easily and quickly attached to the inner rim-member of the mounting by the simple operation of heating the rim, and I therefore wish to claim this feature of the invention broadly. I also believe that I am the first to use the pin or rivet solely for tying the outer rim-member down to the inner member, while securing the outer member from longitudinal movement by means of an integral lug or abutment projecting from the inner rim to indent the non-metallic material to take the thrust between the parts.

Without limiting myself to the exact embodiment of the invention herein shown and described, what I claim is:

1. In an ophthalmic mounting, the combination of an inner metallic rim-member, an outer non-metallic rim-member surrounding the inner member, and means for fastening the outer member from displacement on the inner member comprising a thin blade swaged up from the metal of the inner member to project radially outward therefrom and extending circumferentially of the outer periphery thereof to adapt it to be embedded in the inner side of the outer member without piercing therethrough.

2. In an ophthalmic mounting, the combination of an inner metallic rim-member, an outer non-metallic rim-member surrounding the inner member, a pin soldered to the inner member and projecting through a hole at the end of the outer rim-member, and an auxiliary holding means for taking the longitudinal thrust between the two members, said means comprising a thin blade swaged up from the metal of the inner member to project radially outward therefrom and extending circumferentially thereof at a distance from the fastening pin to adapt it to be embedded in the inner side of the outer member without piercing therethrough.

3. In an ophthalmic mounting, the combination of an inner metallic rim-member, an outer non-metallic rim-member surrounding the inner member, a pin constructed of solder which may be fused at its end to unite it with the inner member by heating the latter to adapt the pin to be riveted through the end of the outer member, and an integral lug projecting from the periphery of the inner member to adapt it to be embedded in the side of the outer member at a distance rearwardly from the pin.

4. In an ophthalmic mounting, an inner metallic rim-member for holding the spectacle or eyeglass lens, an outer non-metallic rim-member surrounding the inner member, and a pin of solder which is fused to the inner member by heating the latter, said pin projecting through a hole in the outer member to tie the two parts together.

5. An eyeglass frame comprising an eyewire, a pin having one end soldered to the outer surface of said eyewire and extending outward therefrom, a non-metallic covering fitting the eyewire and being provided with a hole near the end thereof adapted to receive said pin, the outer end of which is adapted to be headed over to secure said covering to the eyewire.

In testimony whereof I affix my signature.

LAURENCE C. MARTIN.